US012384655B2

(12) United States Patent
Manes et al.

(10) Patent No.: US 12,384,655 B2
(45) Date of Patent: Aug. 12, 2025

(54) ELECTRICAL POWER TRANSMISSION TO ELEVATOR SYSTEM CARS

(71) Applicant: OTIS ELEVATOR COMPANY, Farmington, CT (US)

(72) Inventors: Enrico Manes, Feeding Hills, MA (US); Atsushi Yamada, Chiba (JP); Suman Dwari, Vernon, CT (US); Craig Drew Bogli, Avon, CT (US); Stephen Savulak, Woodbury, CT (US); Ronnie E. Thebeau, Haddam, CT (US); Michael Garfinkel, West Hartford, CT (US)

(73) Assignees: OTIS ELEVATOR COMPANY, Farmington, CT (US); NIPPON OTIS ELEVATOR COMPANY, Tokyo (JP)

( * ) Notice: Subject to any disclaimer, the term of this patent is extended or adjusted under 35 U.S.C. 154(b) by 1643 days.

(21) Appl. No.: 16/712,163

(22) Filed: Dec. 12, 2019

(65) Prior Publication Data

US 2020/0189882 A1 Jun. 18, 2020

Related U.S. Application Data

(60) Provisional application No. 62/779,550, filed on Dec. 14, 2018.

(51) Int. Cl.
*B66B 1/34* (2006.01)
*B66B 1/46* (2006.01)
(Continued)

(52) U.S. Cl.
CPC ............ *B66B 1/467* (2013.01); *B66B 1/3469* (2013.01); *B66B 11/04* (2013.01); *H01R 41/02* (2013.01); *B66B 9/02* (2013.01); *B66B 11/0226* (2013.01)

(58) Field of Classification Search
CPC ......... B66B 5/06; B66B 19/007; B66B 3/002; B66B 11/0407; B66B 7/08; B66B 5/20;
(Continued)

(56) References Cited

U.S. PATENT DOCUMENTS 6,408,986 B1 6/2002 Ayano et al.
7,896,137 B2 * 3/2011 Ishikawa .................. B66B 1/34 187/290
(Continued)

FOREIGN PATENT DOCUMENTS

CN 201825607 U 5/2011
CN 102295204 A * 12/2011
(Continued)

OTHER PUBLICATIONS

Chinese Office Action for Chinese Application No. 201911278418.8; dated Oct. 11, 2021; 9 pages.
(Continued)

*Primary Examiner* — Christopher Uhlir
(74) *Attorney, Agent, or Firm* — CANTOR COLBURN LLP

(57) ABSTRACT

An elevator system includes a hoistway, an elevator car movable along the hoistway, and a power management and transfer system. The power management and transfer system includes an electrical power source, a hoistway contactor secured in the hoistway and operably connected to the electrical power source, and a car contactor disposed at the elevator car, such that when the car contactor is brought into operable contact with the hoistway contactor, electrical power is transferrable between the power source and the elevator car.

18 Claims, 5 Drawing Sheets

(51) Int. Cl.

| | |
|---|---|
| ***B66B 11/04*** | (2006.01) |
| ***H01R 41/02*** | (2006.01) |
| *B66B 9/02* | (2006.01) |
| *B66B 11/02* | (2006.01) |

(58) Field of Classification Search

CPC ....... B66B 5/028; B66B 7/064; B66B 13/125; B66B 2201/216; B66B 5/10; B66B 1/306; B66B 9/0807; B66B 1/34; B66B 1/3415; B66B 1/3423; B66B 1/3469; B66B 1/38; B66B 1/46; B66B 11/02; B66B 11/0206; B66B 11/0226

See application file for complete search history.

(56) References Cited

U.S. PATENT DOCUMENTS

| | | | | |
|---|---|---|---|---|
| 9,216,881 | B2 * | 12/2015 | Banno | B66B 1/34 |
| 9,837,860 | B2 | 12/2017 | McCarthy et al. | |
| 2002/0112924 | A1 | 8/2002 | Mori et al. | |
| 2017/0101291 | A1 * | 4/2017 | Bogli | H02J 7/0031 |
| 2018/0009638 | A1 | 1/2018 | Fargo et al. | |
| 2019/0144242 | A1 * | 5/2019 | Shijo | H01F 27/36 187/393 |
| 2020/0195047 | A1 * | 6/2020 | Manes | B66B 11/0226 |

FOREIGN PATENT DOCUMENTS

| | | | | | |
|---|---|---|---|---|---|
| CN | 202272592 | U | | 6/2012 | |
| CN | 102556786 | A | | 7/2012 | |
| CN | 102712443 | A | * | 10/2012 | B66B 1/34 |
| CN | 103879849 | A | | 6/2014 | |
| CN | 105398918 | A | | 3/2016 | |
| CN | 106995167 | A | | 8/2017 | |
| CN | 111320040 | A | * | 6/2020 | B66B 1/06 |
| CN | 111404287 | A | * | 7/2020 | B66B 11/04 |
| EP | 3153442 | A1 | * | 4/2017 | B66B 1/30 |
| EP | 3560872 | A1 | * | 10/2019 | |
| EP | 3666703 | A1 | * | 6/2020 | B66B 1/06 |
| EP | 3705436 | A1 | * | 9/2020 | B66B 1/28 |
| IN | 105000438 | A | | 10/2015 | |
| JP | 2001139242 | A | | 5/2001 | |
| JP | 2001302120 | A | * | 10/2001 | |
| JP | 2005145652 | A | | 6/2005 | |
| JP | 2012006748 | A | * | 1/2012 | |
| JP | 2013014424 | A | | 1/2013 | |
| KR | 101217879 | B1 | * | 1/2013 | |
| WO | WO-2011092853 | A1 | * | 8/2011 | B66B 1/34 |
| WO | WO-2016118466 | A1 | * | 7/2016 | B66B 1/24 |
| WO | 2017140654 | A1 | | 8/2017 | |

OTHER PUBLICATIONS

European Search Report for European Application No. 19215369.0, dated May 12, 2020, 34 pages.

* cited by examiner

ELECTRICAL POWER TRANSMISSION TO ELEVATOR SYSTEM CARS

CROSS-REFERENCE TO RELATED APPLICATIONS

This application claims the benefit of U.S. Provisional Application No. 62/779,550, filed Dec. 14, 2018, which is incorporated herein by reference in its entirety.

BACKGROUND

The embodiments herein relate to elevator systems, and in particular to power transmission to elevator cars disposed in a hoistway of an elevator system.

Conveyance systems, such as, for example, elevator systems, escalator systems, and moving walkways require electric power for operation. Travelling cables typically connect an elevator car of the elevator system to a stationary power source to provide power to the elevator car. Travelling cables may add expense, weight, and complexity to elevator car operation and installation.

SUMMARY

In one embodiment, an elevator system includes a hoistway, an elevator car movable along the hoistway, and a power management and transfer system. The power management and transfer system includes an electrical power source, a hoistway contactor secured in the hoistway and operably connected to the electrical power source, and a car contactor disposed at the elevator car, such that when the car contactor is brought into operable contact with the hoistway contactor, electrical power is transferrable between the power source and the elevator car.

Additionally or alternatively, in this or other embodiments the hoistway contactor is positioned at a hoistway wall of the hoistway at, a landing floor, or a hoistway ceiling.

Additionally or alternatively, in this or other embodiments the hoistway contactor is positioned at a pit of the hoistway.

Additionally or alternatively, in this or other embodiments the car contactor is positioned beneath a car floor of the elevator car.

Additionally or alternatively, in this or other embodiments a car position sensor is located in the hoistway, and a contactor drive is operably connected to the car position sensor and to the hoistway contactor. The hoistway contactor is movable from a retracted position into an extended position in operable contact with the car contactor by the contactor drive upon sensing of the presence of the elevator car by the car position sensor.

Additionally or alternatively, in this or other embodiments the contactor drive is one of an electrical motor or a linear actuator.

Additionally or alternatively, in this or other embodiments the contactor drive is configured to move the hoistway contactor from the extended position to the retracted position when the car position sensor does not sense the presence of the elevator car.

Additionally or alternatively, in this or other embodiments the contactor drive is configured to move the hoistway contactor from the extended position to the retracted position after a selected elapsed time at the extended position.

Additionally or alternatively, in this or other embodiments the car contactor is operably connected to an energy storage device disposed at the elevator car, the energy storage device charged via electrical power transfer from the power source.

Additionally or alternatively, in this or other embodiments the energy storage device is configured to provide electrical power to one or more elevator car electrical loads.

Additionally or alternatively, in this or other embodiments the one or more elevator car electrical loads are one or more of a lighting system, a ventilation system or a car drive system.

Additionally or alternatively, in this or other embodiments one or more of the car contactor or the hoistway contactor is formed from one of a metal leaf, roller or brush.

Additionally or alternatively, in this or other embodiments one or more alignment features align the hoistway contactor with the car contactor.

Additionally or alternatively, in this or other embodiments the one or more alignment features include one or more of a magnetic feature or a two-dimensional motor.

In another embodiment, a method of operating an elevator system includes moving an elevator car along a hoistway of an elevator system, operably connecting a hoistway contactor located at the hoistway to a car contactor disposed at the elevator car, and transferring electrical power between a power source and the elevator car via the operable connection of the hoistway contactor an the car contactor.

Additionally or alternatively, in this or other embodiments an energy storage device of the elevator car is charged via the transfer of electrical power from the power source.

Additionally or alternatively, in this or other embodiments one or more elevator car systems are powered by the energy storage device.

Additionally or alternatively, in this or other embodiments the hoistway contactor located at one of a landing floor or a pit of the hoistway is operably connected to the car contactor.

Additionally or alternatively, in this or other embodiments the presence of the elevator car is detected via a position sensor disposed in the hoistway, and the hoistway contactor is moved from a retracted position into operable connection with the car contactor when the presence of the elevator car is detected.

Additionally or alternatively, in this or other embodiments the hoistway contactor is returned to the retracted position when the presence of the elevator car is no longer detected.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1:
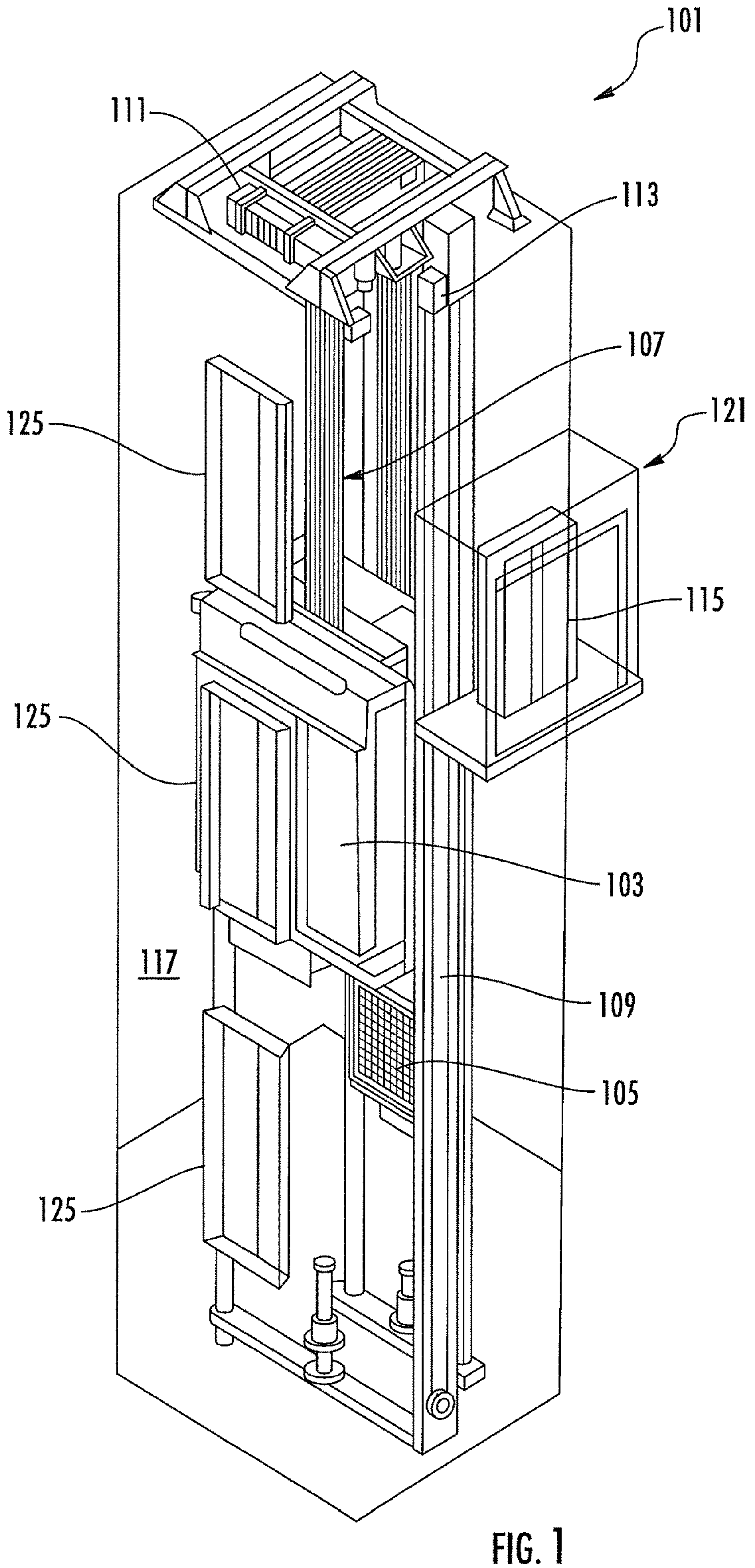
FIG. 1 is a schematic illustration of an elevator system that may employ various embodiments of the present disclosure.

FIG. 1 is a perspective view of an elevator system 101 including an elevator car 103, a counterweight 105, a tension member 107, a guide rail 109, a machine 111, a position reference system 113, and a controller 115. The elevator car 103 and counterweight 105 are connected to each other by the tension member 107. The tension member 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator hoistway 117 and along the guide rail 109.

The tension member 107 engages the machine 111, which is part of an overhead structure of the elevator system 101. The machine 111 is configured to control movement between the elevator car 103 and the counterweight 105. The position reference system 113 may be mounted on a fixed part at the top of the elevator hoistway 117, such as on a support or guide rail, and may be configured to provide position signals related to a position of the elevator car 103 within the elevator hoistway 117. In other embodiments, the position reference system 113 may be directly mounted to a moving component of the machine 111, or may be located in other positions and/or configurations as known in the art. The position reference system 113 can be any device or mechanism for monitoring a position of an elevator car and/or counter weight, as known in the art. For example, without limitation, the position reference system 113 can be an encoder, sensor, or other system and can include velocity sensing, absolute position sensing, etc., as will be appreciated by those of skill in the art.

The controller 115 is located, as shown, in a controller room 121 of the elevator hoistway 117 and is configured to control the operation of the elevator system 101, and particularly the elevator car 103. For example, the controller 115 may provide drive signals to the machine 111 to control the acceleration, deceleration, leveling, stopping, etc. of the elevator car 103. The controller 115 may also be configured to receive position signals from the position reference system 113 or any other desired position reference device. When moving up or down within the elevator hoistway 117 along guide rail 109, the elevator car 103 may stop at one or more landings 125 as controlled by the controller 115. Although shown in a controller room 121, those of skill in the art will appreciate that the controller 115 can be located and/or configured in other locations or positions within the elevator system 101. In one embodiment, the controller may be located remotely or in the cloud.

The machine 111 may include a motor or similar driving mechanism. In accordance with embodiments of the disclosure, the machine 111 is configured to include an electrically driven motor. The power supply for the motor may be any power source, including a power grid, which, in combination with other components, is supplied to the motor. The machine 111 may include a traction sheave that imparts force to tension member 107 to move the elevator car 103 within elevator hoistway 117.

Although shown and described with a roping system including tension member 107, elevator systems that employ other methods and mechanisms of moving an elevator car within an elevator hoistway may employ embodiments of the present disclosure. For example, embodiments may be employed in ropeless elevator systems using a linear motor to impart motion to an elevator car. Embodiments may also be employed in ropeless elevator systems using a hydraulic lift to impart motion to an elevator car. FIG. 1 is merely a non-limiting example presented for illustrative and explanatory purposes.

In other embodiments, the system comprises a conveyance system that moves passengers between floors and/or along a single floor. Such conveyance systems may include escalators, people movers, etc. Accordingly, embodiments described herein are not limited to elevator systems, such as that shown in FIG. 1.

Figure 2:
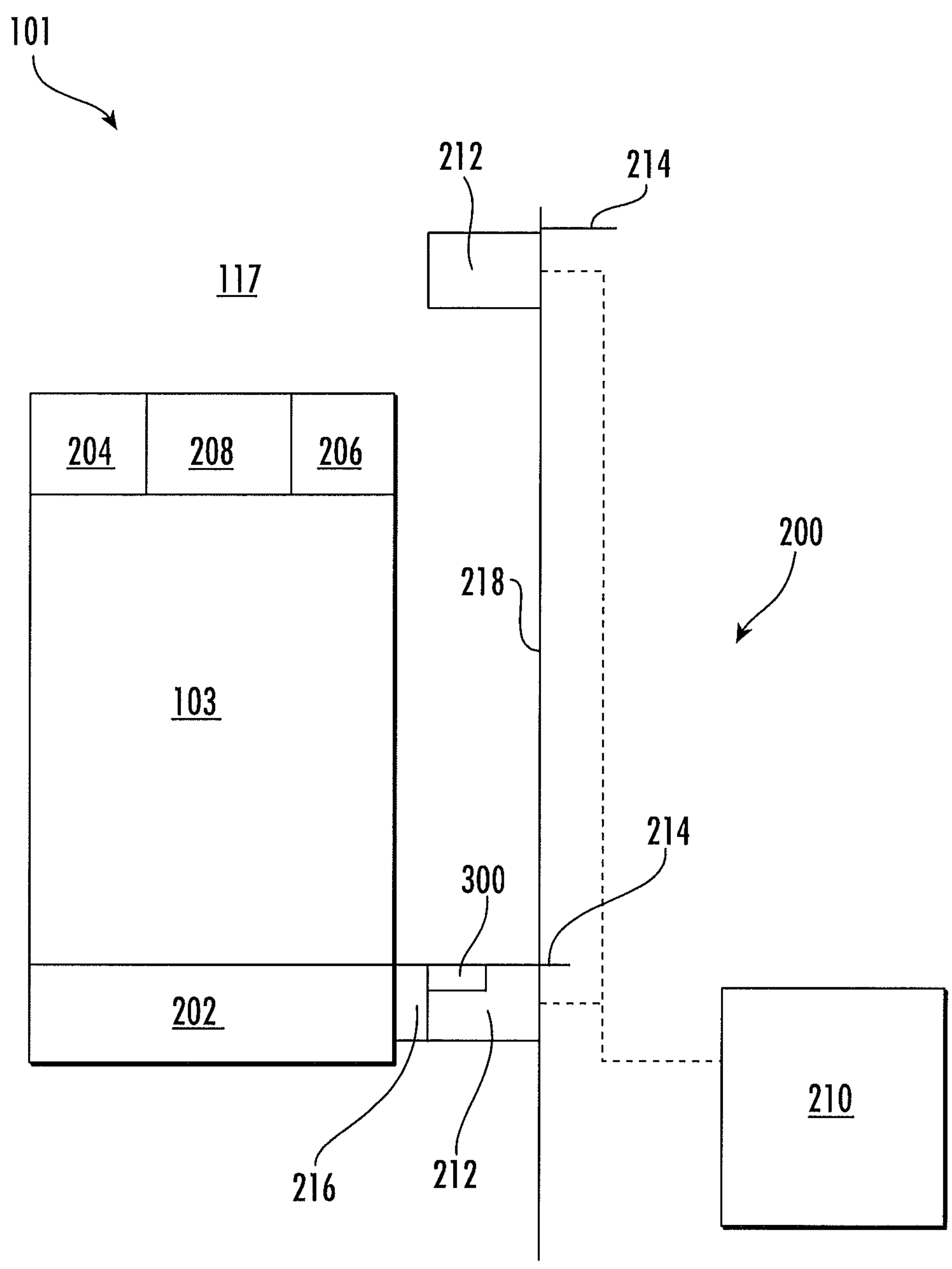
FIG. 2 is a schematic illustration of an embodiment of a power management and transfer system of an elevator system.

Referring now to FIG. 2, the elevator system 101 includes a power management and transfer system 200. An energy storage device 202, such as a battery or the like, is located at the elevator car 103 and is utilized to power electrical systems of the elevator car 103, for example, lighting system 204, ventilation system 208, or the like. In some embodiments, the energy storage device 202 may be utilized to provide electrical power to an elevator car 103 mounted drive system, such as a linear motor drive system 206, or the like. An electrical power source 210 is located, for example, in the hoistway 117, or alternatively outside the hoistway 117.

One or more hoistway contactors 212 are operably connected to the power source 210 and are located in the hoistway 117. In some embodiments, such as shown in FIG. 2, a hoistway contactor 212 is located at each landing floor 214 of the elevator system 101, or at selected landing floors 214 of the elevator system 101. A car contactor 216 is located at the elevator car 103, and is connected to the energy storage device 202. The car contactor 216 is configured and positioned such that when the elevator car 103 arrives at a landing floor 214 having a hoistway contactor 212 located thereat, the car contactor 216 aligns with the hoistway contactor 212. Electrical power is then transmitted from the power source 210 to the energy storage device 202 via the alignment of the car contactor 216 with the hoistway contactor 212. In some embodiments, the car contactor 216 and/or the hoistway contactor 212 are formed from, for example, a metal leaf, roller, or brush, which in some embodiments is spring loaded to ensure adequate contact between the car contactor 216 and the hoistway contactor 212 for transmission of electrical power therethrough to charge the energy storage device 202 of the elevator car 103. While electrical power is transferred via the car contactor 216 and the hoistway contactor 212, in other embodiments the contactors 212 and 216 may be utilized as a communications link to transfer data such as elevator system health information and load profiles between the elevator car 103 and the controller 115. The communications link may be as an alternative to or in addition to the transfer of electrical power.

Figure 3:
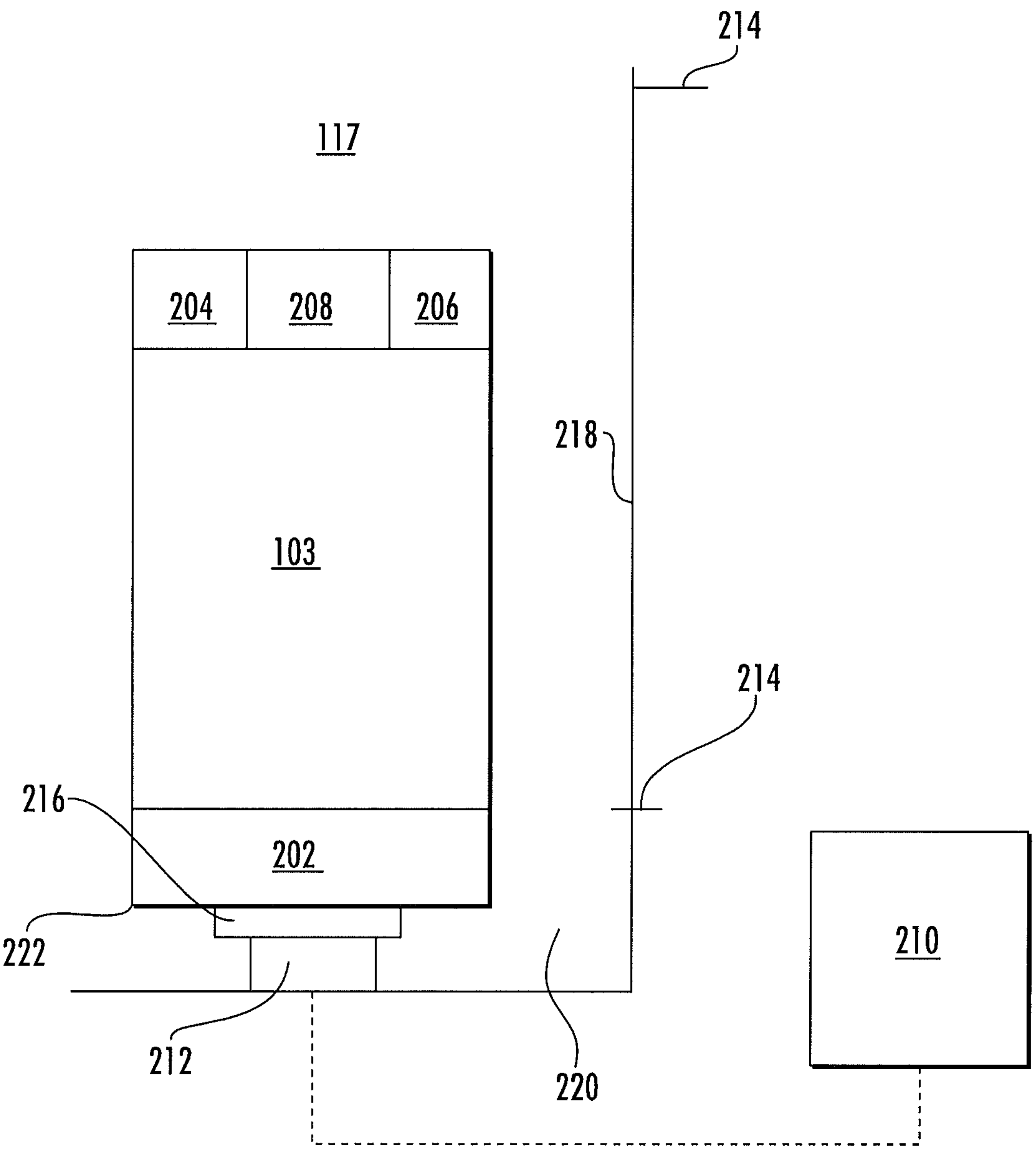
FIG. 3 is a schematic illustration of another embodiment of a power management and transfer system of an elevator system.

While in the embodiment of FIG. 2, the hoistway contactors 212 are located at the hoistway wall 218, in other embodiments, other locations may be utilized. For example, in the embodiment of FIG. 3, a hoistway contactor 212 is located in a pit 220 of the hoistway 117, such that when the elevator car 103 is at its lowest position in the hoistway 117, the hoistway contactor 212 aligns with the car contactor 216, which in this embodiment is located beneath a car floor 222 of the elevator car 103. Such an arrangement may be utilized in addition to or as an alternative to the configuration shown in FIG. 2. Further, in some embodiments the hoistway contactor 212 may similarly be located above the elevator car 103 in which case the car contactor 216 aligns with the hoistway contactor 212 when the elevator car 103 is at its highest position in the hoistway 117.

Figure 4:
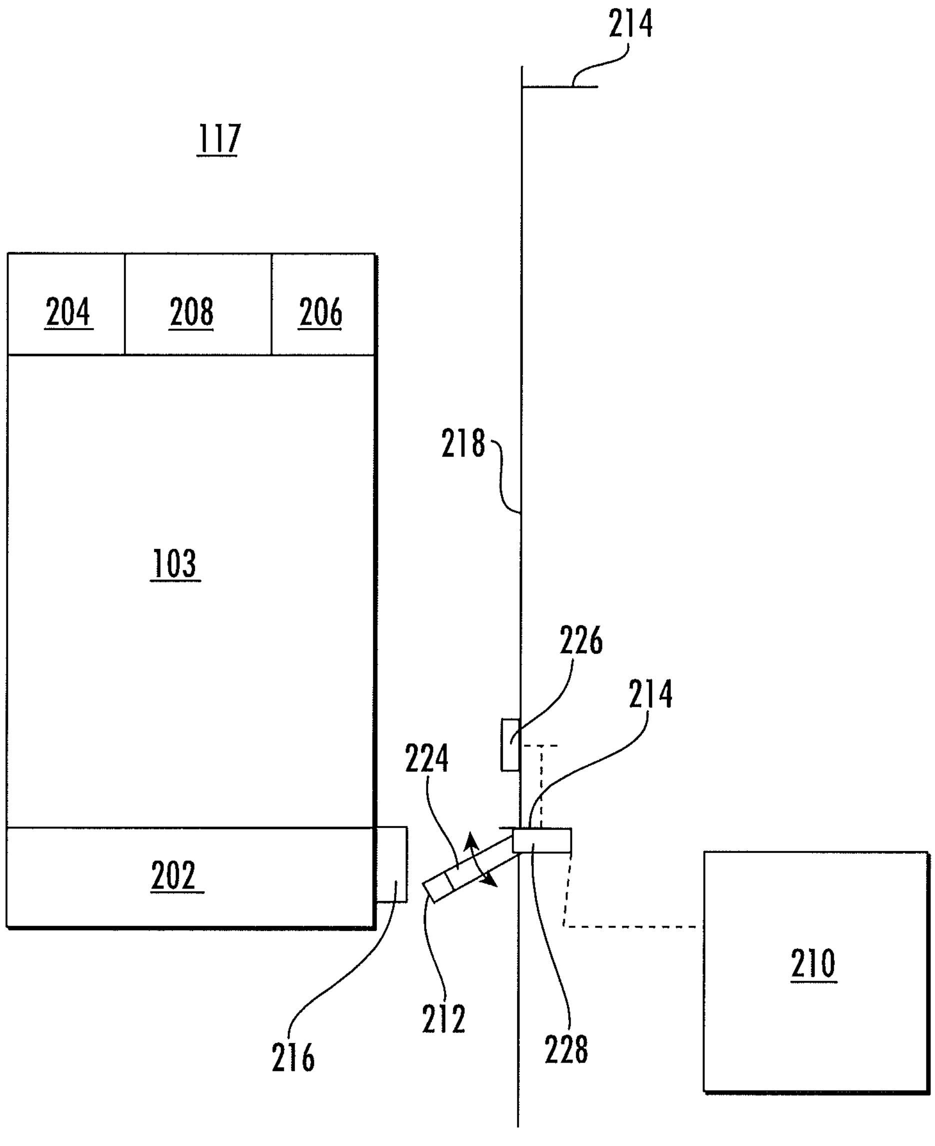
FIG. 4 is a schematic illustration of yet another embodiment of a power management and transfer system of an elevator system.
Figure 5:
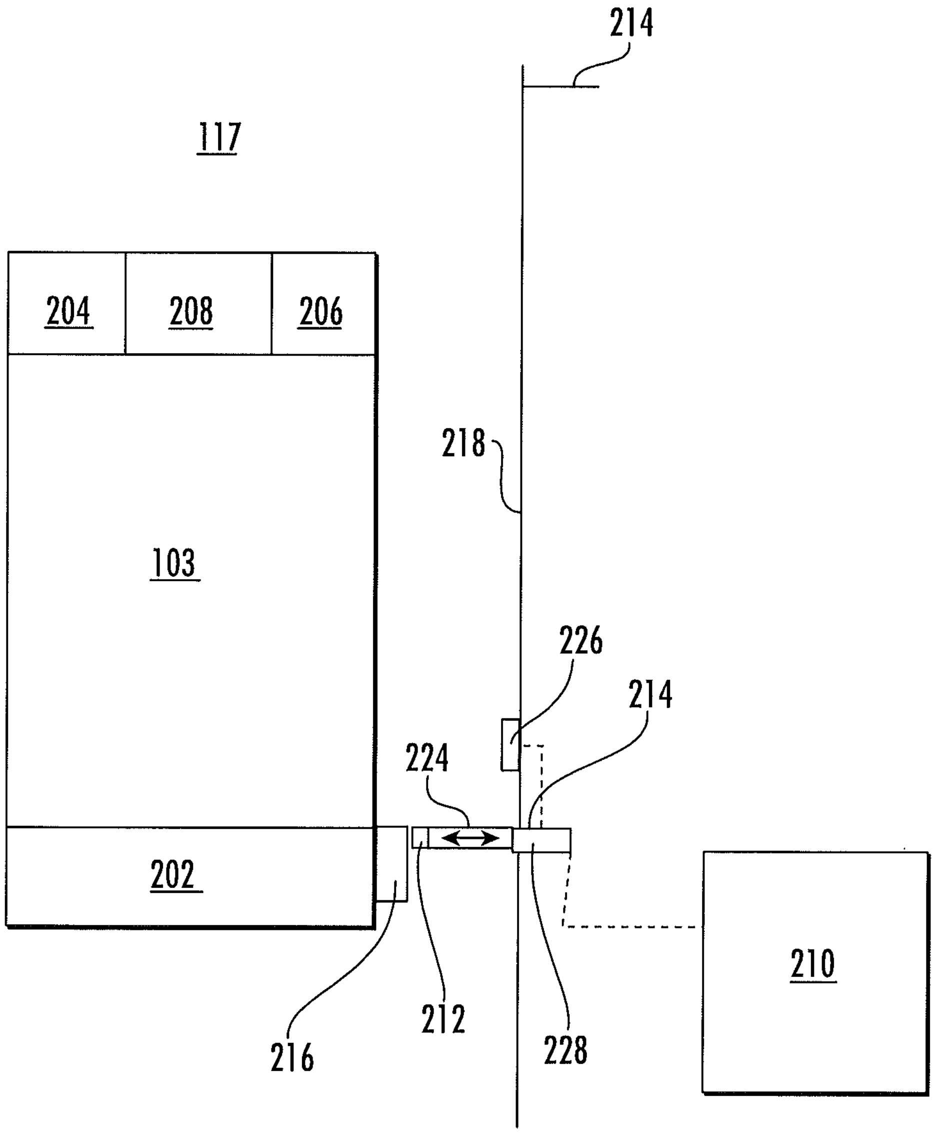
FIG. 5 is a schematic illustration of still another embodiment of a power management and transfer system of an elevator system.

Referring now to FIG. 4, in some embodiments the hoistway contactor 212 is movable depending on the presence of an elevator car 103. This alleviates a potential ride quality concern when compared to a fixed-position hoistway contactor 212 that the elevator car 103 will ride over with each passing. As shown, the hoistway contactor 212 is mounted on a contact arm 224 and normally held close to the hoistway wall 218. A position sensor 226 is located in the hoistway 117. When the position sensor 226 detects the presence of an elevator car 103 at the hoistway contactor 212 location, the hoistway contactor 212 is extended via an arm drive 228 from its retracted position to an extended position such that the hoistway contactor 212 aligns with the car contactor 216 allowing for the transfer of electrical power therethrough. In some embodiments, such as shown in FIG. 4, the arm drive 228 is an electrical motor or the like, and the contact arm 224 may take the form of a rotational actuator such as shown in FIG. 4, or alternatively a linear actuator such as shown in FIG. 5. One skilled in the art will readily appreciated, however, that these configurations are merely exemplary and that other arrangements may be utilized to move the hoistway contactor 212 into contact with the car contactor 216. Once the position sensor 226 no longer detects the presence of the elevator car 103, the arm drive 228 moves the hoistway contactor 212 to its retracted position. In other embodiments, the arm drive 228 moves the hoistway contactor 212 to its retracted position prior to movement of the elevator car 103, for example, after a selected time period at the extended position. While in the embodiments described herein the hoistway contactor 212 is extended and retracted, one skilled in the art will appreciate that in other embodiments the car contactor 216 is extended and/or retracted for contact with the hoistway contactor 212. Further still, in other embodiments both the car contactor 216 and the hoistway contactor 212 may be movable.

In other embodiments, the power management and transfer system 200 may also include a mechanical release and latch system that could mechanically/kinematically cause the release and alignment of the hoistway contactor 212 and the car contactor 216 whereby the ability is controlled remotely. For example, an electromechanical control that releases an interface cam that allows the elevator car 103 motion to cause the rest of the mechanism to be aligned by the elevator car 103 itself. When not necessary the electromechanical device pulls the interface cam away from the elevator interface so that it can go through without interaction. In some embodiments, the power management and transfer system 200 may include one or more alignment features 300 to ensure alignment and sufficient contact between the car contactor 216 and the hoistway contactor 212. Such features may include a magnetic feature and/or a 2D motor to correctly position the hoistway contactor 212 relative to the hoistway contactor 216. In other embodiments, conic topologies of the car contactor 216 and the hoistway contactor 212 may be utilized. This way, there is a lot of clearance at the beginning of the interface but as there is closure of the gap, the conic section is guided into the proper orientation. The tips of the cones could be used for transferring current.

The configurations disclosed herein provide a simple cost effective solution to provide electrical power to the elevator car 103, specifically to charge the energy storage device 202. This allows for the elimination of the typical travelling cable for electrical power transmission, improving ride quality and reducing cost of the elevator system 101.

The term “about” is intended to include the degree of error associated with measurement of the particular quantity and/or manufacturing tolerances based upon the equipment available at the time of filing the application.

The terminology used herein is for the purpose of describing particular embodiments only and is not intended to be limiting of the present disclosure. As used herein, the singular forms “a”, “an” and “the” are intended to include the plural forms as well, unless the context clearly indicates otherwise. It will be further understood that the terms “comprises” and/or “comprising,” when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, subcombinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. An elevator system, comprising:
a hoistway;
an elevator car movable along the hoistway; and
a power management and transfer system including:
an electrical power source;
a hoistway contactor secured in the hoistway and operably connected to the electrical power source; and
a car contactor disposed at the elevator car, such that when the car contactor is brought into operable contact with the hoistway contactor, electrical power is transferrable between the power source and the elevator car;
a car position sensor disposed in the hoistway; and
a contactor drive operable connected to the car position sensor and to the hoistway contactor;
wherein the hoistway contactor is movable from a retracted position into an extended position in operable contact with the car contactor by the contactor drive upon sensing of the presence of the elevator car by the car position sensor.

2. The elevator system of claim 1, wherein the hoistway contactor is disposed at a hoistway wall of the hoistway at, a landing floor, or a hoistway ceiling.

3. The elevator system of claim 1, wherein the hoistway contactor is disposed at a pit of the hoistway.

4. The elevator system of claim 3, wherein the car contactor is disposed beneath a car floor of the elevator car.

5. The elevator system of claim 1, wherein the contactor drive is one of an electrical motor or a linear actuator.

6. The elevator system of claim 1, wherein the contactor drive is configured to move the hoistway contactor from the extended position to the retracted position when the car position sensor does not sense the presence of the elevator car.

7. The elevator system of claim 1, wherein the contactor drive is configured to move the hoistway contactor from the extended position to the retracted position after a selected elapsed time at the extended position.

8. The elevator system of claim 1, wherein the car contactor is operably connected to an energy storage device disposed at the elevator car, the energy storage device charged via electrical power transfer from the power source.

9. The elevator system of claim 8, wherein the energy storage device is configured to provide electrical power to one or more elevator car electrical loads.

10. The elevator system of claim 9 wherein the one or more elevator car electrical loads are one or more of a lighting system, a ventilation system or a car drive system.

11. The elevator system of claim 1, wherein one or more of the car contactor or the hoistway contactor is formed from one of a metal leaf, roller or brush.

12. The elevator system of claim 1, further comprising one or more alignment features to align the hoistway contactor with the car contactor.

13. The elevator system of claim 12, wherein the one or more alignment features include one or more of a magnetic feature or a two-dimensional motor.

14. A method of operating an elevator system, comprising:

moving an elevator car along a hoistway of an elevator system;

operably connecting a hoistway contactor disposed at the hoistway to a car contactor disposed at the elevator car;

transferring electrical power between a power source and the elevator car via the operable connection of the hoistway contactor and the car contactor;

detecting the presence of the elevator car via a position sensor disposed in the hoistway; and moving the hoistway contactor from a retracted position into operable connection with the car contactor when the presence of the elevator car is detected.

15. The method of claim 14, further comprising charging an energy storage device of the elevator car via the transfer of electrical power from the power source.

16. The method of claim 15, further comprising powering one of more elevator car systems by the energy storage device.

17. The method of claim 14, further comprising operably connecting the hoistway contactor disposed at one of a landing floor or a pit of the hoistway to the car contactor.

18. The method of claim 14, further comprising returning the hoistway contactor to the retracted position when the presence of the elevator car is not detected.

* * * * *